United States Patent [19]

Van Roessel

[11] Patent Number: 4,535,351
[45] Date of Patent: Aug. 13, 1985

[54] SETTING-UP SYSTEM FOR A TELEVISION CAMERA

[75] Inventor: Frederik J. Van Roessel, Upper Saddle River, N.J.

[73] Assignee: U.S. Philips Corporation, New York, N.Y.

[21] Appl. No.: 456,942

[22] Filed: Jan. 10, 1983

[30] Foreign Application Priority Data

Jan. 22, 1982 [NL] Netherlands .................. 8200234

[51] Int. Cl.³ .............................................. H04N 9/62
[52] U.S. Cl. .................................... 358/10; 358/139
[58] Field of Search .......................... 358/10, 51, 139

[56] References Cited

U.S. PATENT DOCUMENTS 4,326,219  4/1982  Griesshaber ........................ 358/10
4,340,903  7/1982  Tamura ............................... 358/10
4,354,243 10/1982  Ryan .................................. 358/10

Primary Examiner—Michael A. Masinick
Attorney, Agent, or Firm—Thomas A. Briody; William J. Streeter

[57] ABSTRACT

A system for setting up a video camera. A signal processing circuit provides a plurality of signal channels which may be selectively connected to receive the camera output signal. A microcomputer is provided which stores digital correction values corresponding to minimum error values of distinct sub areas of the video signal. An error measuring circuit determines error values between the average value of a video signal taken over distinct sub areas of a television picture and a reference value. Each of the channels are selectively connected to the digital error measuring circuit to detect an error in the video signal passing through a connected channel.

12 Claims, 1 Drawing Figure

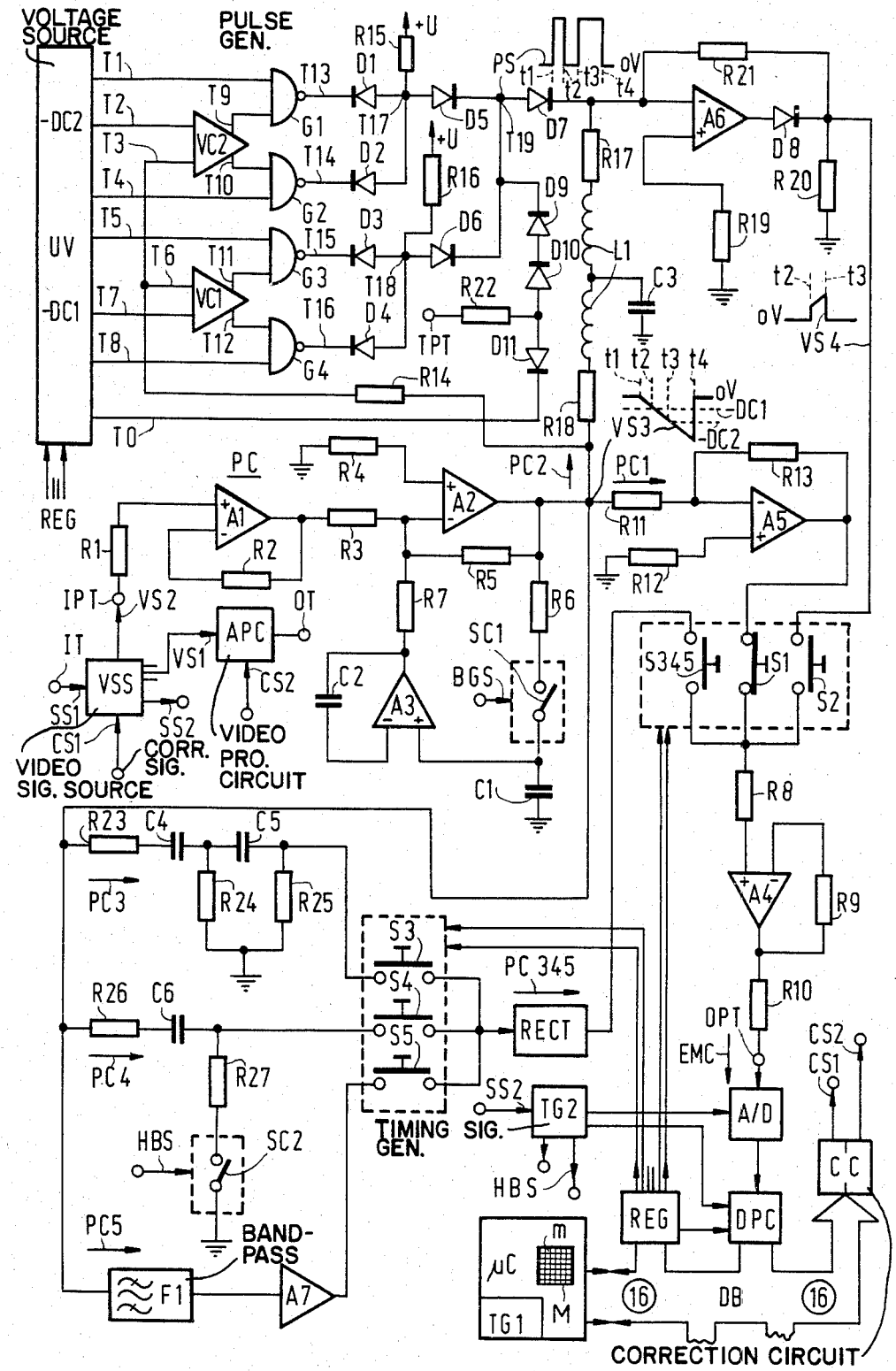

SETTING-UP SYSTEM FOR A TELEVISION CAMERA

BACKGROUND OF THE INVENTION

The invention relates to a setting-up system for a television camera. The system comprises a signal source incorporating a television pick-up device for producing at least one video signal, a signal processing circuit and a subsequent digital error measuring circuit for determining, in association with a microcomputer, error values between the average value of a signal applied thereto taken over distinct sub-areas of a television picture, and a reference value. The microcomputer comprises at least one digital store having separate store locations for storing digital correction values corresponding to minimal error values and being associated with the sub-areas, and a signal correction circuit for effecting, while digital correction values are applied, a signal correction resulting in a video signal corrected for each sub-area.

Such a camera setting-up system is disclosed in U.S. Pat. No. 4,285,004. The Patent describes a camera, which is suitable for color television and comprises a pick-up device for producing three color signals. Corrections are effected to obtain a good registration of the three color pictures on display and to correct shading errors at black level and peak white value. In addition, a gamma correction and a focusing correction can be effected. Depending on the type of the correction, the signal correction circuit applies the correction signal to the pick-up device (for scanning and focusing correction) or to a video signal processing circuit (for shading and gamma correction). To obtain the different types of correction signals the error measuring circuit incorporates as many error measuring channels as there are types of correction signals, and a reference channel, one of the three color signals being selectively applied to these error measuring channels through a change-over switch.

SUMMARY OF THE INVENTION

The invention has for its object to provide a television camera setting-up system in which corrections of a different type can be obtained with the least possible number of circuit components. According to the invention, a setting-up system includes a signal processing circuit which precedes the digital error measuring circuit which incorporates a plurality of parallel channels each having a different, analog, signal transfer characteristic. The parallel channels are selectively connected through a change-over switch, to the digital error measuring circuit which incorporates a digital error measuring channel which is common to the parallel channels.

The invention recognizes that to obtain the simplest possible construction of the setting-up system operating with the sub-areas, it is most advantageous to provide the digital error measuring circuit with a single, common digital error measuring channel and to process the signal to be measured in such an analog manner in the relevant parallel channel that the measured error value is characteristic of the type of the correction to be performed.

A setting-up system in accordance with the invention, suitable for a color television camera, provides raster registration correction for television line rasters, between a reference raster corresponding to a reference signal and a raster corresponding to a camaera video signal, for which purpose a difference signal which represents the difference between the reference signal and the video signal is adjusted to a minimum. A parallel channel suitable for that purpose in the signal processing circuit has a transfer characteristic which is determined by a signal differentiating circuit which, during line scanning periods, is switched-on by means of a switch provided therein and is switched off during line blanking periods, and by a subsequent rectifier circuit.

In a further, practical embodiment the time constant of the signal differentiating circuit corresponds to a plurality of line periods.

To effect a further correction, a setting-up system in accordance with the invention provides focusing correction. The parallel channel suitable for that purpose in the signal processing circuit has a transfer characteristic which is determined by a high-pass filter and by a subsequent rectifier circuit.

In a further, practical embodiment the high-pass filter has a 12 dB-per-octave-filter characteristic.

To effect another correction, a setting-up system in accordance with the invention, suitable for a color television camera, provides a minimal presence of a chrominance subcarrier wave in a luminance signal. The parallel channel suitable for a measurement thereof incorporated in the signal processing circuit, has a transfer characteristic which is determined by a bandpass filter tuned to the chrominance subcarrier frequency and by a subsequent rectifier circuit.

To obtain an increased amount of measuring information, a setting-up system in accordance with the invention employs as the rectifier circuit a full-wave rectifier circuit.

To effect a still further correction, a setting-up system in accordance with the invention provides a measurement at a video signal level. The parallel channel suitable for that purpose in the signal processing circuit has a transfer characteristic which is determined by a threshold-limiter circuit.

In a further embodiment the threshold-limiter circuit comprises a pulse generator having an input to which the video signal to be measured is applied and an output for supplying pulses when the instantaneous video signal value has a certain offset from the selected level. The output is connected to an input of an adder circuit having a further input to which the video signal is applied and an output which is connected to an input of a half-wave rectifier circuit. The output of the half wave rectifier circuit for carrying a suppressed video signal during the pulses, is connected to the digital error measuring channel.

In a still further embodiment the pulse generator incorporates two voltage comparison circuits, each having a first and a second output, a first and a second input to which respective voltages to be compared are applied and a third and a fourth input to which voltages may be applied which block the voltage comparison circuit(s) between the first and second inputs and the first and second outputs, respectively. A first or a second input, respectively of each voltage comparison circuit is coupled to said input of the pulse generator and the remaining inputs to the microcomputer while the outputs of the voltage comparison circuits are coupled to each other through diodes which are separately biased for each voltage comparison circuit and coupled to the input of the rectifier circuit through a further diode incorporated in the adder circuit.

DESCRIPTION OF THE DRAWING

The invention will now be further described by way of example accordance with an embodiment of the invention described in accompanying drawing.

DESCRIPTION OF THE PREFERRED EMBODIMENT

In the drawing, a video signal source is denoted by VSS. The video signal source VSS comprises a television pick-up device, not shown, which is suitable for black-white television or color television. A composite synchronizing signal SS1 is applied to an input terminal IT of the source VSS, this source producing one or more video signals intended for picture display, one of which is denoted by VS1. The video signal VS1 intended for picture display is applied to an analog signal processing circuit APC, an output of which is connected to an output terminal OT. Correction signals CS1 and CS2 are respectively applied to the source VSS and to the circuit APC from a signal correction circuit CC. The correction signal CS1 produces in, for example, a color television pick-up device, a raster registration correction. For black-white and color television, the correction signal CS1 might provide an optical or electronic focusing correction at the pick-up device incorporated in the source VSS. The correction signal CS2 may produce, for example, a shading correction or a gamma correction for black-white or color television or a chrominance subcarrier suppression in a luminance signal for color television. In the first instance, which type of correction is effected at the video signal source VSS and/or the analog video signal processing circuit APC is not defined. Let it be assumed that after an optimum camera setting-up the circuit APC supplies from the output terminal OT a video signal for optimum picture display.

For the supply of the correction signals CS1 and CS2 the correction circuit CC is connected to a data bus DB having, for example, 16 lines. Connected to the data bus DB are a microcomputer $\mu$C, a register REG and a digital signal processing circuit DPC. Other components connected to the data bus DB are not shown. At the micro-computer $\mu$C it is shown that it incorporates a timing signal generator TG1 and a memory M having separate memory locations m. Circuit DPC shows that a signal input is connected to an output of an analog-to-digital converter A/D, a control input connected to an output of a timing signal generator TG2 and an enable input connected to an output of the register REG. A clock pulse input of the converter A/D is connected to an output terminal of the timing signal generator TG2. A signal input of the converter A/D is connected to an output terminal OPT of a signal processing circuit PC in accordance with the invention, which will be described hereinafter, and has an input terminal IPT connected to an output of the signal source VSS carrying a signal VS2. For synchronizing purposes a synchronizing signal SS2 is applied from the source VSS to the timing signal generator TG2, which further supplies a line blanking signal HBS and, with color television, a chrominance subcarrier burst gate signal BGS, outside field blanking, periods. The analog-to-digital converter A/D and the digital signal processing circuit DPC form a digital error measuring channel EMC, which, in association with the microcomputer $\mu$C, ensures that the correct correction information is applied to the signal correction circuit CC through an error measuring circuit (A/D, DPC, TG2, REG). After setting-up, M correction values, each associated with a corresponding sub-area of a television picture, are stored in the separate memory locations m of the digital memory M. With the described construction, a memory M may be provided in the microcomputer $\mu$C for each type of correction. For a detailed, possible construction of the circuit DPC and a description of its operation in association with the microcomputer $\mu$C reference is made to co-pending U.S. patent application Ser. No. 449,075, filed Dec. 13, 1982. A possible construction of an optimum linearly operating analog-to-digital converter A/D reference is made to co-pending U.S. patent application Ser. No. 438,123, filed Nov. 1, 1982.

For the present invention the detailed construction of the error measuring channel EMC and the cooperation with the microcomputer $\mu$C is of secondary importance. It is essential that there is one single digital error measuring channel EMC which is connected to the output terminal OPT of the signal processing circuit PC in accordance with the invention.

The signal VS2 is applied to the input terminal IPT of the circuit PC. The signal VS2 may be a black-white or color television video signal. For color television, the signal VS2 may be a single color signal or a luminance signal, or a difference signal between two color signals. The choice of the type of the signal VS2 depends on the type of correction to be effected during the setting-up. In accordance with one aspect of the invention, the circuit PC comprises a number of selective parallel channels, designated PC1, PC2, PC3, PC4 and PC5, the channel selection being associated with a specific, analog transfer characteristic and the signal type selection of the signal VS2. The separate channels PC3, PC4 and PC5 are followed by a common channel PC 345. Anticipating the detailed description of the parallel channels PC1 to PC5, inclusive to be selected, each having a specific, analog transfer characteristic, it is mentioned that, for a selected channel PC1, PC2, PC3 or PC5 the signal VS2 is a video signal which varies between, for example, black level and peak white value. The channel PC5 being chosen, the video signal VS2 is a luminance signal for color television, as through this channel, a chrominance subcarrier measurement is effected. It will be seen that a focusing correction for black-white or color television can be effected through the channel PC3, it being possible to measure selectively through the channel PC2, the video signal above, below and between adjustable threshold values for effecting a gamma or shading correction and it being possible to measure, through the channel PC1, the average video signal value for effecting, for example, a shading correction. Channel PC4 being selected, the difference signal between two color signals or between a color signal and a reference signal is measured for effecting a raster registration correction.

In the signal processing circuit PC, a common portion comprising differential amplifiers A1, A2 and A3 precedes the parallel channels PC1 to PC5, inclusive. The input terminal IPT is connected to the (+) input of the amplifier A1 through a resistor R1. The output of the amplifier A1 is connected through resistor R2 to its (−) input and though a resistor R3 to the (−) input of the amplifier A2, the (+) input of which is connected to ground through a resistor R4. The output of the amplifier A2 is connected through a resistor R5 to its (−)

TPT, then this can be effected by adjusting the threshold values $-DC1$ and $-DC2$ to the maximum negative value and to supply an adequate positive voltage from the output T0. In this situation the diode D11 is non-conductive and the signal applied to the terminal TPT through the connecting diode D10 and D9 may result in pulses in the signal PS at the junction T19, the diodes D5 and D6 being non-conducting. This selection feature can be utilized when an electrically generated test pattern is used instead of an optionally produced test pattern.

To explain the signal selection by means of the pulse generator PG the following Table applies.

TABLE 1

The variation of the signal VS3 relative to the threshold values $-DC1$ and $-DC2$ and the resulting logic values

|  | T3 | T6 | T9 | T10 | T11 | T12 |
|---|---|---|---|---|---|---|
| 0/VS3/−DC1 | H | H | 1 | 0 | 0 | 1 |
| −DC1/VS3/−DC2 | H | L | 1 | 0 | 1 | 0 |
| −DC2/VS3 | L | L | 0 | 1 | 1 | 0 | wherein

H signifies a less negative voltage and

L a more negative voltage relative to the threshold value.

Table 2

Four selection codes and their results.

| 1 | | | | 2 | | | | 3 | | | | 4 | | | |
|---|---|---|---|---|---|---|---|---|---|---|---|---|---|---|---|
| T1 | T4 | T5 | T8 | T1 | T4 | T5 | T8 | T1 | T4 | T5 | T8 | T1 | T4 | T5 | T8 |
| 1 | 0 | 0 | 1 | 1 | 0 | 1 | 0 | 0 | 1 | 1 | 0 | 1 | 0 | 1 | 1 |
| T13 | T14 | T15 | T16 | T13 | T14 | T15 | T16 | T13 | T14 | T15 | T16 | T13 | T14 | T15 | T16 |
| 0 | 1 | 1 | 0 | 0 | 1 | 1 | 1 | 1 | 1 | 1 | 1 | 0 | 1 | 1 | 0 |
| 0 | 1 | 1 | 1 | 0 | 1 | 0 | 1 | 1 | 1 | 0 | 1 | 0 | 1 | 0 | 1 |
| 1 | 1 | 1 | 1 | 1 | 1 | 0 | 1 | 1 | 0 | 0 | 1 | 1 | 1 | 0 | 1 |
| T17 | T18 | | | T17 | T18 | | | T17 | T18 | | | T17 | T18 | | |
| 0 | 0 | | | 0 | 1 | | | 1 | 1 | | | 0 | 0 | | |
| 0 | 1 | | | 0 | 0 | | | 1 | 0 | | | 0 | 0 | | |
| 1 | 1 | | | 1 | 0 | | | 0 | 0 | | | 1 | 0 | | |
| T19 | | | | T19 | | | | T19 | | | | T19 | | | |
| 0 | | | | 1 | | | | 1 | | | | 0 | | | |
| 1 | | | | 0 | | | | 1 | | | | 0 | | | |
| 1 | | | | 1 | | | | 0 | | | | 1 | | | |

The biased diodes D1, D2 and D3, D4, respectively, correspond to a logic OR-function which also holds for the diodes D5 and D6.

From Table 2, which shows the selection codes and their results, it follows that at the code 1 a positive pulse would occur in the signal PS (point T19) from the instant t2 to the instant t4. This results in the rectifier circuit (A6, D8, R19, R20, R21) allowing the video signal VS3 to pass only at signal values which are less negative than the threshold value $-DC1$.

The code 2 results in two positive pulses, more specifically between the instants t1 and t2, and t3 and t4. The shown signal PS corresponds therewith. Only video signal values located between the threshold values $-DC1$ and $-DC2$ are allowed to pass.

The code 3 would result in a positive pulse in the signal PS (point T19) between the instants t1 and t3. Now only video signal values are allowed to pass which are more negative than the threshold value $-DC2$.

The code 4 would result in a positive pulse in the signal PS (point T19) from the instant t3 onwards. All video signal values less negative than the threshold value $-DC2$ are then allowed to pass.

In addition to the described gamma correction during the setting-up, the parallel channel PC2 may further be utilized by means of the described signal selection for adjusting shading errors at specifically the black level and the peak-white value. To this end an optical test pattern is used, having black and white blocks, for example in the form of a chess board pattern. A uniform illumination of this test pattern and recording thereof by the pick-up device in the signal sources VSS results in a video signal VS2 which on display would show this black-white pattern. From the signal VS3 corresponding therewith, which signal is not shown, which has alternately the black-white information, it is only possible when selection in accordance with code 1 (Table 2) is effected to measure the information at the black level. When selection is effected in accordance with the code 3 (Table 2) only the information at the peak-white values is measured. The code change-over from the microcomputer μC is sufficient to perform these adjustments, without the necessity of an adaptation for the shading measurement at the black level in an optical path at the pick-up device in the source VSS.

When the test pattern with the black and white blocks is elaborated by grey blocks, it is possible to adjust a desired gamma correction by means of a signal selection based on these grey blocks. These grey blocks may be provided, for example, around the center of the chess board pattern.

The parallel channel PC3 is suitable for adjusting the optical and electronic focusing, adjustment being made until a maximum of high-frequency detail is obtained on display, by measuring a high-frequency component in the video signal VS3. The output of the amplifier A2 carrying the video signal VS3 is connected to a terminal of a resistor R23. The other terminal of the resistor R23 is connected to a ground through a capacitor C4 arranged in series with a resistor R24. The junction between the capacitor C4 and the resistor R24 is connected to ground by a capacitor C5 and a series resistor R25, the junction between this capacitor C5 and series resistor R25 being connected to a terminal of the switch S3. The other terminal of the switch S3 and terminals of the switches S4 and S5 incorporated in the respective parallel channels PC4 and PC5 connected thereto are connected to an input of a rectifier circuit RECT the output of which is connected to a terminal of the switch S345. The circuit RECT forms part of the parallel channel PC 345 which is common to the parallel channels PC3, PC4 and PC5. The rectifier circuit RECT is in the form of a full-wave rectifier circuit, whereby advantageously a measuring data increase is obtained at all three parallel channels PC3, PC4 and PC5 in association always with the channel PC 345.

The transfer characteristic of the parallel channel PC3 is predominantly determined by a high-pass filter (C4, R24, C5, R25). In practice it has been found that a 12 dB-per-octave filter characteristic is very satisfactory for focus measurement. The following values may be chosen for such a filter: capacitors C4 and C5 equal to 1.5 nF and resistors R24 and R25 equal to 1000 Ohm. As there are also matching and isolating resistors, not further described, the resistor R23 is a 75 Ohm matching resistor. The analog transfer characteristic of the parallel channel (PC3, PC345) for the focusing adjustment is predominantly determined by the high-pass filter (C4, R24, C5, R25) and the subsequent (full-wave rectifier) circuit RECT.

The parallel channel (PC4, PC345) is intended for a raster registration correction for which purpose the signal VS3 to be applied to it is a difference signal between two color signals or between a color signal and an (other) reference signal. The switches S4 and S345 are then in the closed condition. The output signal VS3 of the amplifier A2 is applied to a series arrangement of a capacitor C6, a resistor R27 and a switch SC2 through a matching resistor R26. The junction of the capacitor C6 and the resistor R27 is connected to a terminal of the switch S4. The switch SC2 switches line periodically under the control of the line blanking signal HBS, the switch SC2 being in the switched-on condition during line scanning periods and in the switched-off condition in line blanking periods. As a result thereof signal edges which may occur in the (video) line blanking periods do not affect the raster registration measurement. During the raster registration adjustment, adjustment is effected until a maximum measuring value has been obtained as the reference value. The parallel channel PC4 then has a transfer characteristic which is predominiently determined by a differentiating circuit (C6, R27, SC2). In practice it has been found that a differentiating circuit is very satisfactory when the following values are chosen: Capacitor C6 equal to 0.22 $\mu$F and resistor R27 equal to 1000 Ohm. The time constant of the differentiating circuit is equal to 220 $\mu$s, which value is of the order of magnitude of some line periods (for example a line period of 64 $\mu$s) and which has been found to be very satisfactory in practice. A switch of the Philips type HEF 4066 B may be chosen for the switch SC2.

The parallel channel (PC5, PC345) is provided to enable a measurement of the degree to which the chrominance subcarrier is present in a luminance signal VS3 applied thereto. To that end, the output of the amplifier A2 is connected to an input of a bandpass filter F1 which is tuned to the chrominance subcarrier frequency. The construction of the filter F1 is not further described and it may consist of two parallel-arranged filters, one tuned to the NTSC-chrominance sub-carrier frequency and the other one to the PAL-chrominance subcarrier frequency. The filter F1 is followed by, for example, a 20 dB-amplifier A7, the output of which is connected to the switch S5. The transfer characteristic of the parallel channel PC5 is here predominantly determined by the filter characteristic of the filter F1, the rectifier RECT contributing in the channel (PC5, R345) to the transfer characteristic. The adjustment is effected until a minimal measuring value has been obtained as the reference value.

From the preceding it appears that the parallel channels PC1, PC2 and PC3, PC4, PC5 in association with the channel PC345 each have a specific, analog transfer characteristic which results in an error value to be measured which is characteristic of the type of correction to be performed. Summarizing the above, they are the conveyance of a non-processed signal for the shading correction (PC1), the signal level selection (PC2) for gamma correction and shading correction at black level and peak-white value, the high-frequency filter characteristic (PC3) for focusing, the signal differentiation (PC4) for the raster registration and the chrominance subcarrier filtering (PC5) for the minimalization thereof.

Instead of arranging the change-over switch (S1, S2, S345, S3, S4, S5) in the specified place, a change-over switch subsequent to the amplifier A2 and having five switching contacts for the respective parallel channels PC1, PC2, PC3, PC4 and PC5 may be utilized.

Thus, there is described a system for setting up multiple parameters of a television camera system. Those skilled in the art will recognize yet other embodiments described more particularly by the claims which follow.

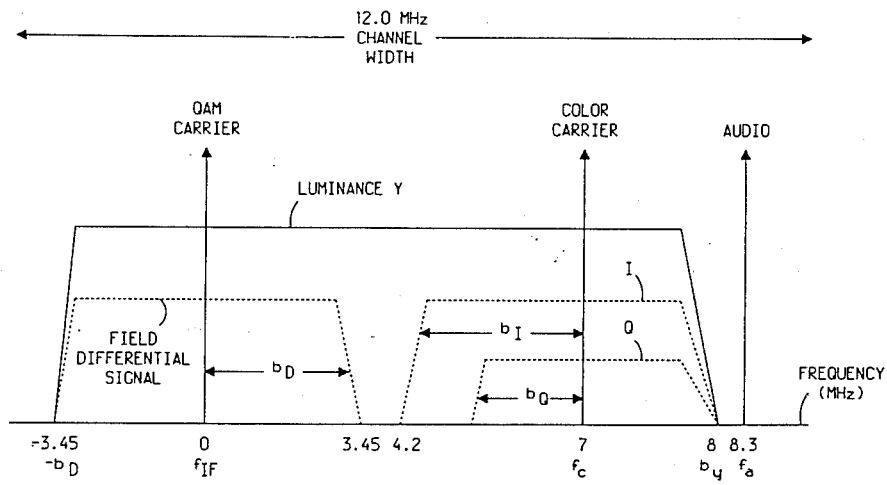

What is claimed is:

1. A system for establishing the parameters for a television camera which produces a video signal, comprising:
   a signal processing circuit including a plurality of parallel signal channels, each of said channels having a different signal transfer characteristic;
   a microcomputer having a memory with separate storage locations for storing digital correction values corresponding to minimum error values of distinct sub areas of a television video signal;
   a digital error measuring circuit for determining error values between the average value of a video signal taken over distinct sub areas of a television picture and a reference value;
   a signal correction circuit for substituting said stored digital correction values in said video signal; and
   means for selectively connecting each of said channels to said digital error measuring circuit, whereby an error in each of said channels may be detected to indicate said stored correction values should be substituted in said television video signal.

2. A system as claimed in claim 1, suitable for a color television camera which determines a minimal presence of a chrominance subcarrier in a luminance signal, one of said parallel channels suitable for a measurement thereof having a transfer characteristic which is determined by a bandpass filter tuned to the chrominance subcarrier frequency and by a subsequent rectifier circuit.

3. A setting-up system as claimed in claim 2, wherein said rectifier circuit is a full-wave rectifier circuit.

4. A system according to claim 1 wherein one of said channels is provided to effect raster registration corrections between a reference signal and a raster of said video signal, said one channel including a signal differentiating circuit which during line scanning periods of said video signal is switched on, and during line blanking periods is switched off, and a rectifier circuit connected to said differentiating circuit output.

5. A system as claimed in claim 4 wherein the time constant of the signal differentiating circuit corresponds to a plurality of line periods.

6. A system as claimed in claim 4 wherein said rectifier circuit is a full-wave rectifier circuit.

7. A system according to claim 1 wherein one of said channels performs a focusing correction, said channel having a transfer characteristic determined by a high pass filter and a subsequent rectifier circuit.

8. A system as claimed in claim 7, wherein the high-pass filter has a 12 dB-per octave filter characteristic.

9. A setting-up system as claimed in claim 7, wherein said rectifier circuit is a full-wave rectifier circuit.

10. A system according to claim 1 wherein one of said parallel channels includes a limiter with a threshold level which is selectable, wherein specific signal levels may be measured.

11. A system as claimed in claim 10, wherein the limiter circuit comprises a pulse generator having an input to which the video signal to be measured is applied, and an output for supplying pulses when the instantaneous video signal value has a certain offset from the selected level, the output being connected to an input of an error circuit having a further input to which the video signal is applied, and an output connected to an input of a half-wave rectifier circuit the output of which carries a suppressed video signal is connected to the digital error measuring circuit.

12. A setting-up system as claimed in claim 11, wherein the pulse generator comprises two voltage comparison circuits each having a first and a second output, a first and second input to which respective voltages to be compared are applied, and a third and a fourth input to which voltages may be applied which block the voltage comparison circuit(s) between the first and second inputs and the first and second outputs, respectively, a first or a second input, respectively, of each voltage comparison circuit being coupled to said input of the pulse generator and the remaining inputs to the microcomputer while the outputs of the voltage comparison circuits are coupled to each other with diodes which are separately biased for each voltage comparison circuit and coupled to the input of the half-wave rectifier circuit with a further diode.

* * * * *

United States Patent [19]

Haskell

[11] Patent Number: 4,535,352

[45] Date of Patent: Aug. 13, 1985

[54] TECHNIQUE FOR GENERATING SEMI-COMPATIBLE HIGH DEFINITION TELEVISION SIGNALS FOR TRANSMISSION OVER TWO CABLE TV CHANNELS

[75] Inventor: Barin G. Haskell, Tinton Falls, N.J.

[73] Assignee: AT&T Bell Laboratories, Murray Hill, N.J.

[21] Appl. No.: 600,805

[22] Filed: Apr. 16, 1984

[51] Int. Cl.$^3$ ............... H04N 9/38; H04N 9/39; H04N 9/42; H04N 9/32

[52] U.S. Cl. ............... 358/16; 358/11; 358/12

[58] Field of Search ............... 358/11, 16, 12

[56] References Cited

U.S. PATENT DOCUMENTS

| | | | |
|---|---|---|---|
| 2,686,831 | 8/1954 | Dome | 178/6.8 |
| 3,617,626 | 11/1971 | Bluth et al. | 178/6.6 A |
| 4,296,431 | 10/1981 | Holland | 358/12 |
| 4,300,161 | 11/1981 | Haskell | 358/142 |
| 4,429,327 | 1/1984 | Oakley et al. | 358/12 |
| 4,473,837 | 9/1984 | Tiemann | 358/12 |
| 4,476,484 | 10/1984 | Haskell | 358/11 |

OTHER PUBLICATIONS

Karen Berney, "CBS Bares Scheme for 1,050 Line TV", *Electronics*, Oct. 6, 1983, pp. 52, 54.
Kerns H. Powers, "Compatibility Aspects of HDTV", *High Definition Television Colloquium*, Ottawa, Canada, Oct. 18–21, 1982, pp. 1.6-1–1.6-17.
*IEEE Trans. on Broadcasting*, vol. BC–24(4), Dec., 1978, "A Study of . . . ", by T. Fujio, pp. 92–100.
*IEEE Trans. on Broadcasting*, vol. BC–25(4), Dec., 1979, "Present Situation of . . . ", by T. Ishida et al, pp. 105–112.
*SMPTE Journal*, vol. 89(2), Feb., 1980, "The Future of High-Definition . . . ", by D. G. Fink, pp. 89–94.
*SMPTE Journal*, vol. 89(3), Mar., 1980, "The Future of High-Definition . . . ", by D. G. Fink, pp. 153–161.
*IEEE Trans. on Broadcasting*, vol. BC–26(2), Jun., 1980, "A Universal Weighted . . . ", by T. Fujio, pp. 39–47.
Electronic Letters, vol. 16(14), Jul. 3, 1980, "Fibre Optic Analogue . . . ", by K. Asatani et al, pp. 536–538.
*SMPTE Journal*, vol. 89(8), Aug., 1980, "High Definition Television . . . ", by T. Fujio et al, pp. 579–584.
*IBC 80*, Brighton, U. K., Sep. 20–23, 1980, "High Definition Television . . . ", by T. Fujio et al, pp. 14–18.
*NTG-Fachber*, vol. 74, Sep. 30–Oct. 3, 1980, "Concepts for a Compatible . . . ", by B. Wendland, pp. 407–416.
*IEEE Trans. on Broadcasting*, vol. BC–26(4), Dec., 1980, "High-Definition Wide-Screen . . . ", by T. Fujio, pp. 113–124.
*SMPTE Journal*, vol. 30(3), Mar., 1981, "Research and Development . . . ", by K. Kayashi, pp. 178–186.
*BSTJ*, vol. 60(5), May–Jun., 1981, "Time-Frequency Multiplexing (TFM) . . . ", by B. G. Haskell, pp. 643–660.
*IEEE Trans. on Comm.*, vol. COM–29(12), Dec., 1981, "Time Compression Multiplexing . . . ", by K. Y. Eng et al, pp. 1832–1840.

Primary Examiner—John C. Martin
Assistant Examiner—Michael D. Dunnan
Attorney, Agent, or Firm—Erwin W. Pfeifle

[57] ABSTRACT

The present invention relates to a technique for generating a Semi-Compatible High Definition Television (SC-HDTV) signal which can be sent over two present-day Cable Television (CATV) channels. In accordance with the present invention, a HDTV signal is formed comprising a line scan rate which is a multiple of the line scan rate of a current conventional TV signal. The SC-HDTV signal is formed therefrom by transmitting a first HDTV line as is and a second HDTV line as a field differential signal transmitted via QAM on the IF or RF carrier of the first line signal at a line scan rate of a current conventional TV signal. Arrangements are also disclosed frDconverting the SC-HDTV signal back into eigher a HDTV or conventional TV signal.

14 Claims, 10 Drawing Figures